United States Patent
Madsen

(10) Patent No.: US 6,907,156 B1
(45) Date of Patent: Jun. 14, 2005

(54) RECONFIGURABLE MULTI-CHANNEL FILTERS HAVING ENHANCED CHANNEL BANDWIDTH

(75) Inventor: Christi Kay Madsen, South Plainfield, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/573,085

(22) Filed: May 17, 2000

(51) Int. Cl.⁷ .............................. G02B 6/28; G02B 6/26
(52) U.S. Cl. .......................................... 385/24; 385/39
(58) Field of Search ............................ 385/24, 27, 31, 385/39, 47, 37

(56) References Cited

U.S. PATENT DOCUMENTS

| | | | |
|---|---|---|---|
| 6,141,130 A | * 10/2000 | Ip | 359/124 |
| 6,212,315 B1 | * 4/2001 | Doerr | 359/124 |
| 6,259,847 B1 | * 7/2001 | Lenz et al. | 359/130 |
| 6,289,151 B1 | * 9/2001 | Kazarinov et al. | 359/127 |
| 6,304,689 B1 | * 10/2001 | Dingel et al. | 385/14 |
| 6,341,184 B1 | * 1/2002 | Ho et al. | 385/3 |
| 6,351,581 B1 | * 2/2002 | Doerr et al. | 385/24 |

OTHER PUBLICATIONS

Oda et al., A Wide–Band Guided–Wave Periodic Multi/Demultiplexer with a Ring Resonator for Optical FDM Transmission Systems, Journal of Lightwave Technology, vol. 6 No. 6, Jun. 1988, pp 1016–1023.*

Madsen et al., Optical All–Pass Filters for Phase Response Design with Applications for Dispersion Compensation, IEEE Photonics Technology Letters, vol. 10 No. 7, Jul. 1998, pp 994–996.*

Madsen, C.K. Efficient Architectures for Exactly Realizing Optical Filters with Optimum Bandpass Designs, IEEE Photonics Technology Letters, vol. 10 No. 8, Aug. 1998, pp 1136–1138.*

Oda et al., Wideband Guided–Wave Periodic Multi/Demultiplexer with a Ring Cavity for Optical FDM Transmission Systems, Electronics Letters, vol. 24 No. 4, Feb. 1988, pp 210–212.*

C.R. Doerr, et al. "Integrated WDM Dynamic Power Equalizer with Potentially Low Insertion Loss", IEEE Photonics Technology Letters. vol. 10, No. 10, Oct. 1998.

K. Oda, et al, "A Wide–Band Guided–Wave Periodic Multi/Demultiplexer with a Ring Resonator for Optical FDM Transmission Systems",8217 Journal of Lightwave Tehcnology No. 6, (1988) Jun., No. 6, New York, NY, US.

C. Madsen, A Multiport Frequency Band Selector with Inherently Low Loss, Flat, Passbands, and Low Crosstalk; IEEE Photonics Technology Letters, vol. 10, No. 12, Dec. 1998.

C. Madsen, "Efficient Architectures for Exactly Realizing Optical Filters with Optimum Bandpass Designs"; IEEE Photonics Technology Letters, vol. 10, No. 8, Aug. 1998.

* cited by examiner

Primary Examiner—John D. Lee
Assistant Examiner—Sarah Song

(57) ABSTRACT

In accordance with the invention, an MZI-based reconfigurable multi-channel filter is provided with enhanced channel bandwidth by adding an all-pass filter to one or both of the MZI arms. The result is a square-shaped amplitude response closely approximating the ideal.

8 Claims, 3 Drawing Sheets

RECONFIGURABLE MULTI-CHANNEL FILTERS HAVING ENHANCED CHANNEL BANDWIDTH

FIELD OF THE INVENTION

This invention relates to optical communication systems and, in particular, to reconfigurable multi-channel filters for adjusting the amplitudes of different wavelength channels.

BACKGROUND OF THE INVENTION

Optical fiber communication systems are beginning to achieve great potential for the rapid transmission of vast amounts of information. In essence, an optical fiber system comprises a light source, a modulator for impressing information on the light, an optical fiber transmission line for carrying the optical signals and a receiver for detecting the signals and demodulating the information they carry. Increasingly the optical signals are wavelength division multiplexed signals (WDM signals) comprising a plurality of distinct wavelength signal channels.

Reconfigurable multi-channel filters are important components of optical communication systems. Conditions in an optical communication system can change as channels are amplified, added, dropped and rerouted among branches. Multichannel filters are useful in selectively adding or dropping channels and in compensating amplitude variation among different channels. Reconfigurability is needed to adapt to changing conditions.

One conventional multichannel filter is based on the well-known Mach-Zehnder Interferometer (MZI). An MZI comprises a pair of waveguiding arms extending between a pair of couplers. The input is on one arm; and the output, taken from the other arm, depends on the phase difference between the arriving signals. The amplitude of the output varies sinusoidally with wavelength.

To make the MZI into a reconfigurable multi-channel filter, a router is disposed in one of the arms to separate the channels among a plurality of channel arms. Each channel arm is provided with a phase shifter, and the channels are recombined at a second router. Control of the phase of each channel permits control of its amplitude.

A difficulty with this approach is that the MZI sinusoidal response acts as a narrow band filter. This has the drawback of narrowing the bandwidth of each channel. Accordingly there is a need for an improved multi-channel filter with enhanced channel bandwidth.

SUMMARY OF THE INVENTION

In accordance with the invention, an MZI-based reconfigurable multi-channel filter is provided with enhanced channel bandwidth by adding an all-pass filter to one or both of the MZI arms. The result is a square-shaped amplitude response closely approximating the ideal.

BRIEF DESCRIPTION OF THE DRAWINGS

The advantages, nature and various additional features of the invention will appear more fully upon consideration of the illustrative embodiments now to be described in detail. In the drawings.

It is to be understood that these drawings are for purposes of illustrating the concepts of the invention and are not to scale.

DETAILED DESCRIPTION

Figure 1:
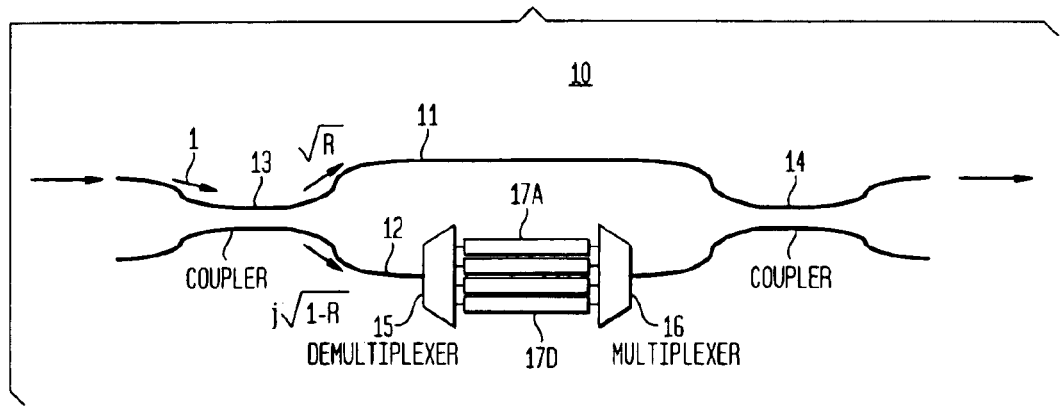
FIG. 1 illustrates a conventional MZI-based reconfigurable multi-channel filter.

Referring to the drawings, FIG. 1 schematically illustrates an MZI-based reconfigurable multi-channel filter comprising, in substance, an MZI 10 comprising a pair of waveguide arms 11, 12 extending between a pair of couplers 13, 14. The waveguide arms have approximately equal optical pathlengths L and L+ΔL, so if the input is applied via arm 11 at coupler 13, the output to arm 12 at coupler 14 depends on the precise phase difference between the arriving signals. Transmission will be a maximum at wavelengths for which the signals on the two arms constructively interfere. Specifically, if ΔΦ is the phase difference between the two arms, the spectral response of the device is a series of transmission maxima where ΔΦ is an odd multiple of π. For a multi-channel system, the communication channels are also periodic, and the MZI can be designed so that its periodic transmission maxima correspond with a plurality of channels.

In order to convert the MZI into a multi-channel filter, one of the arms is provided with a pair of waveguide grating routers (WGRs) 15, 16 and phase shifters 17A, . . . , 17D are disposed in each of the waveguides connecting the routers. One router, e.g. 15, acts as a demultiplexer to separate the multi-channel signal into a plurality of constituent channels and present each channel on a separate wavepath. The second router, e.g. 16, acts as a multiplexer to recombine the channels for passage to the output coupler 14. The phase shifters 17A, . . . , 17D permit independent filtering of each of the channels wavepaths. Since the output level depends on constructive interference, it is highly dependent on the phase at which the channel arrives at the output coupler. Using the phase shifter to shift the phase of a channel away from constructive interference thus attenuates the channel. Further details concerning the structure and operation of this filter can be found in C. Doerr et al., "Integrated WDM Dynamic Power Equalizer with Potentially Low Insertion Loss," IEEE Photon. Technol. Lett., Vol. 10, pp. 1443–1445 (1998) and C. Doerr et al., "Dynamic Wavelength Equalizer in Silica Using the Single Filtered Arm Interferometer," IEEE Photon. Techn. Lett., Vol. 11, pp. 581–583 (1999), both of which are incorporated herein by reference.

Figure 2:
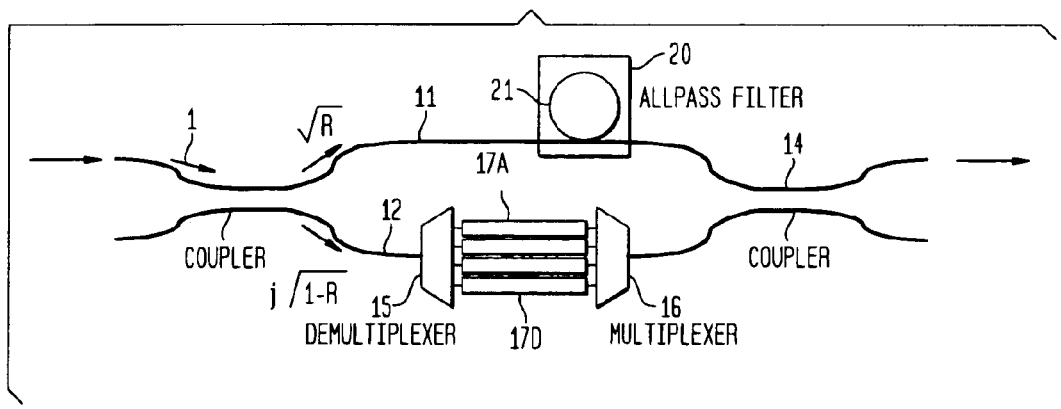
FIG. 2 illustrates an improved MZI-based reconfigurable multi-channel filter.
Figure 5:
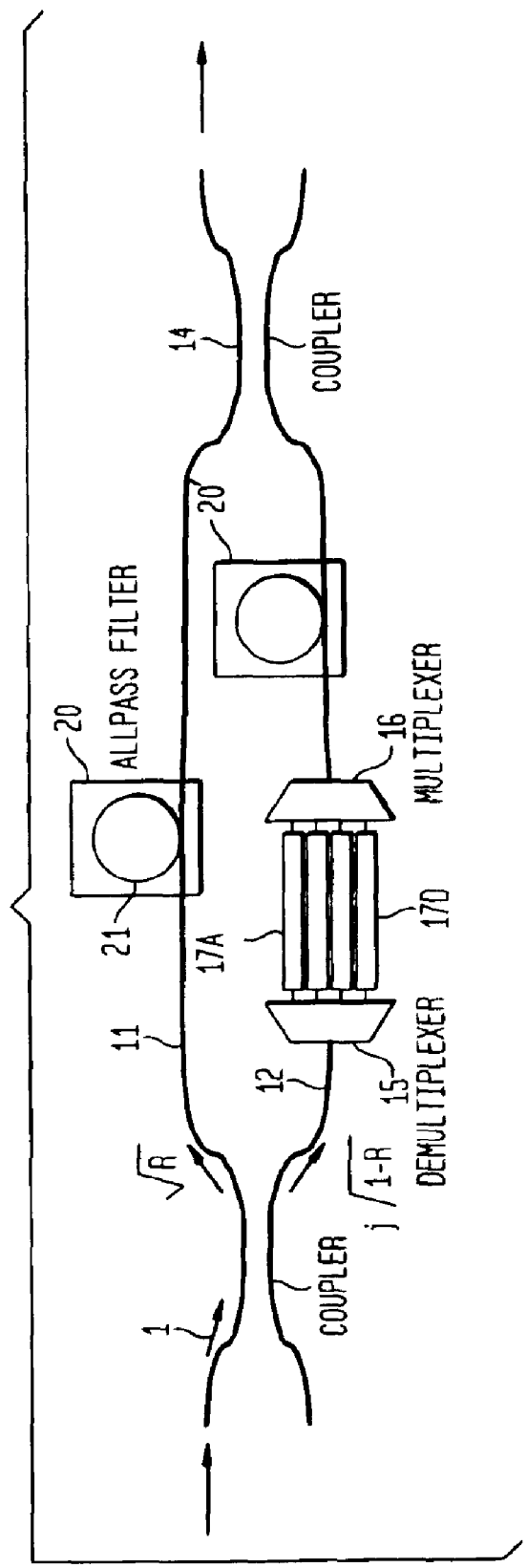
FIG. 5 is an alternative embodiment of the FIG. 2 filter having an all-pass filter in both of the MZI arms.

FIG. 2 illustrates an improved MZI-based reconfigurable multi-channel filter similar to the filter of FIG. 1 except that an all-pass filter 20 is formed on at least one of the MZI arms, e.g. 11. FIG. 5 illustrates an alternative embodiment of the FIG. 2 filter having all-pass filters 20 and 20' coupled in arms 11 and 12, respectively. This is accomplished by disposing a waveguiding ring resonator 21 sufficiently close to the arm to optically couple with the arm.

In operation, a light pulse traveling in the arm couples in part to the ring resonator 21. After transit around the ring, the light couples back to the arm. Interference between light from the resonator and light transmitted on the waveguide produces a frequency dependent time delay that compensates dispersion. The performance of the all-pass filter depends primarily on two parameters: 1) the ring radius, and 2) the coupling strength between the ring and the arm. The ring radius determines the free spectral range (FSR) of the all-pass filter. The response is periodic in frequency and can be matched to the spacing of a plurality of communication channels. The coupling strength determines the maximum group delay and the bandwidth of the delay. Further details concerning the structure and fabrication of all-pass filters are set forth in co-pending U.S. patent application Ser. No. 09/182,980 filed Oct. 30, 1998 and entitled "All-Pass Optical Filter" now U.S. Pat. No. 6,289,151 which is incorporated herein by reference.

Figure 3:
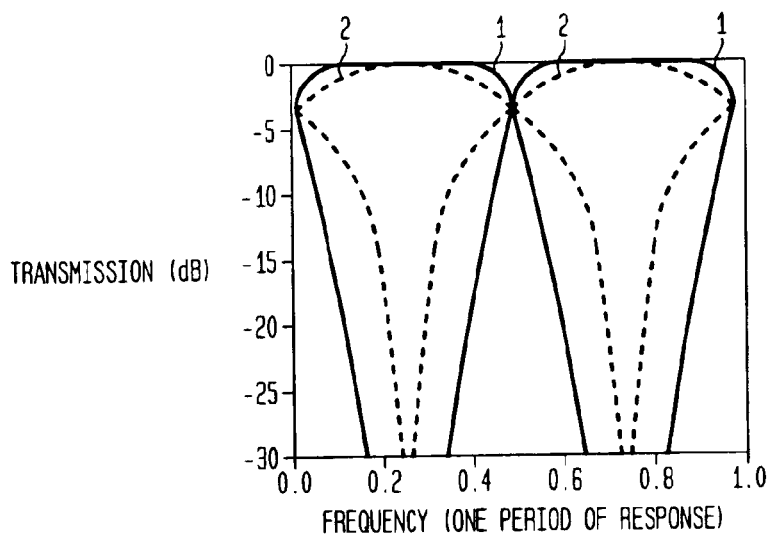
FIG. 3 is graphical illustration showing the improved response of the FIG. 2 filter.

FIG. 3 is a schematic graphical illustration showing the improvement in spectral response exhibited by the filter of FIG. 2. The solid lines (Curves 1) show the response of the FIG. 2 filter. The dashed lines (Curves 2) shows the response of a corresponding conventional FIG. 1 devices. As can be seen, the improved FIG. 2 device has more nearly square responses than the FIG. 1 device.

Figure 4:
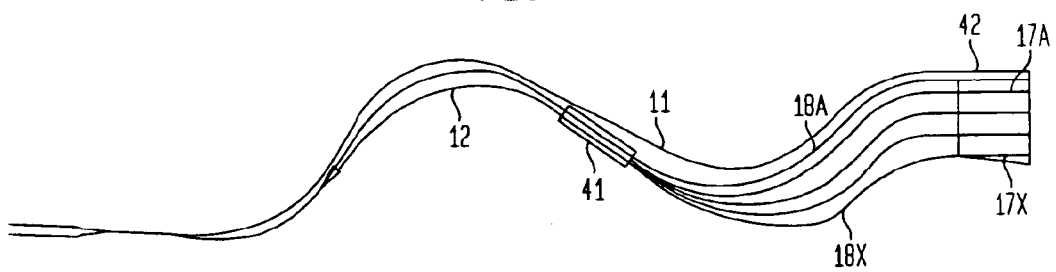
FIG. 4 is an alternative embodiment of the FIG. 2 filter.

FIG. 4 schematically illustrates an alternative embodiment of an improved filter in accordance with the invention using a folded MZI. The FIG. 4 embodiment is similar to the FIG. 2 embodiment except that the arms 11, 12 are folded by reflection. The routers 15, 16 are replaced by a slab multiplexer 41, and the ring resonator all-pass filter is replaced by an etalon all-pass filter 42. The upper arm 11 is coupled to the etalon all-pass filter and an optical signal is reflected back. Similarly, multi-channel light in the lower arm 12 enters the slab multiplexer 41 which divides the signal into separate channels presented on separate waveguides 18A, . . . , 18X. Each of waveguides 18A, . . . , 18×includes a separate phase shifter 17A, . . . , 17×, and each waveguide terminates in a mirror (not shown) reflecting the signal back through its respective waveguide to the multiplexer 41. The signals are recombined in the multiplexer and presented to arm 12 in the reverse direction. Further details concerning the structure and fabrication of a folded MZI are set forth in U.S. patent application Ser. No. 09/035,317 filed by E. Laskowski et al. on Mar. 5, 1998 and entitled "Compact Mach-Zehnder Interferometer and Wavelength Reference Employing Same now U.S. Pat. No. 6,115,520, which is incorporated herein by reference.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. A device comprising:
   a first bidirectional optical coupler having first and second arms;
   a second bidirectional optical coupler having first and second arms;
   an optical demultiplexer having an input and plural outputs;
   a plurality of phase shifters;
   an optical multiplexer having plural inputs and an output;
   a first waveguide optically connecting the first arm of the first bidirectional coupler to the input of the optical demultiplexer, the first waveguide being coupled with a first all-pass optical filter;
   the plurality of phase shifters being optically interposed between the plural outputs of the optical demultiplexer and the plural inputs of the optical multiplexer, and the output of the optical multiplexer connected to the first arm of the second bidirectional optical coupler;
   a second waveguide optically connecting the second arms of the first and second bidirectional optical couplers, the second waveguide being coupled with an second all-pass optical filter.

2. The device of claim 1 wherein the demultiplexer comprises a waveguide grating router.

3. The device of claim 1 wherein the multiplexer comprises a waveguide grating router.

4. The device of claim 1 wherein each of said all-pass optical filters comprises an optical waveguide resonator ring.

5. The device of claim 4 wherein the waveguide resonator ring has a ring radius, and the coupling strength between the waveguide resonator ring and the second waveguide are matched to a channel spacing of a plurality of signals carried on the second waveguide.

6. The device of claim 1 wherein said optical demultiplexer directs signals carried on at least two different wavelength channels through at least two different phase shifters.

7. The device of claim 1 wherein periodic transmission maxima in said device correspond with a plurality of signals carried on a plurality of wavelength channels.

8. A device comprising:
   a folded Mach-Zehnder interferometer comprising a bidirectional coupler optically communicating with first and second waveguide arms;
   said first waveguide arm optically interposed between said coupler and a first mirror;
   a plurality of second mirrors, and a plurality of waveguides optically interposed between said second waveguide arm and said plurality of second mirrors;
   a slab multiplexer optically interposed between said second waveguide arm and said plurality of waveguides;
   a plurality of phase shifters in optical communication with said plurality of waveguides; and
   an etalon all-pass optical filter interposed between said first waveguide arm and said first mirror.

* * * * *